(12) United States Patent
Lo

(10) Patent No.: US 11,798,698 B2
(45) Date of Patent: Oct. 24, 2023

(54) HEAVY ION PLASMA ENERGY REACTOR

(71) Applicant: Austin Lo, Traverse City, MI (US)

(72) Inventor: Austin Lo, Traverse City, MI (US)

( * ) Notice: Subject to any disclaimer, the term of this patent is extended or adjusted under 35 U.S.C. 154(b) by 4 days.

(21) Appl. No.: 17/111,941

(22) Filed: Dec. 4, 2020

(65) Prior Publication Data

US 2022/0181039 A1    Jun. 9, 2022

(51) Int. Cl.
*G21D 7/04* (2006.01)
*G21C 3/40* (2006.01)
*G21H 1/10* (2006.01)
*G21H 1/08* (2006.01)

(52) U.S. Cl.
CPC .............. *G21D 7/04* (2013.01); *G21C 3/40* (2013.01); *G21H 1/08* (2013.01); *G21H 1/106* (2013.01)

(58) Field of Classification Search
CPC ... G21D 7/04; G21C 3/40; G21H 1/08; G21H 1/106; G21H 1/103; H01J 45/00; G21B 1/01
See application file for complete search history.

(56) References Cited

U.S. PATENT DOCUMENTS

| | | | | |
|---|---|---|---|---|
| 1,978,918 A | * | 10/1934 | Terman | H01J 21/20 |
| | | | | 313/302 |
| 3,022,240 A | | 2/1962 | Bassett | |
| 3,093,567 A | * | 6/1963 | Jablonski | G21D 7/04 |
| | | | | 376/310 |
| 3,147,191 A | | 9/1964 | Crowther | |
| 3,211,930 A | * | 10/1965 | Clement | G21C 3/40 |
| | | | | 310/306 |
| 3,228,849 A | | 1/1966 | Fellows | |
| 3,286,107 A | * | 11/1966 | Fein | G21D 7/04 |
| | | | | 310/306 |
| 3,444,400 A | * | 5/1969 | Janner | H01J 45/00 |
| | | | | 310/306 |
| 3,480,803 A | * | 11/1969 | Leffert | H01J 45/00 |
| | | | | 310/306 |
| 3,660,230 A | | 5/1972 | Bailey, Jr. et al. | |
| 3,672,642 A | | 6/1972 | Beisswenger | |
| 3,843,896 A | * | 10/1974 | Rason | G21H 1/106 |
| | | | | 976/DIG. 417 |
| 4,040,903 A | * | 8/1977 | Monroe, Jr. | G21C 3/40 |
| | | | | 376/412 |

(Continued)

FOREIGN PATENT DOCUMENTS

| AU | 254709 B | 1/1964 |
|---|---|---|
| GB | 817754 A | 8/1959 |

(Continued)

OTHER PUBLICATIONS

Lo, Austin Troy. Fission plasmas and their novel application to power producing nuclear reactors in space. University of California, Berkeley, 2020. (Year: 2020).*

(Continued)

*Primary Examiner* — Lily C Garner
(74) *Attorney, Agent, or Firm* — Miller Johnson

(57) ABSTRACT

A method for generating electricity includes generating electricity at a first reactor with a nuclear fuel element and removing the nuclear fuel element from the first reactor. The method also includes providing the nuclear fuel element at a second reactor and generating electricity at the second reactor with the nuclear fuel element.

11 Claims, 5 Drawing Sheets

(56) References Cited

U.S. PATENT DOCUMENTS

| | | | |
|---|---|---|---|
| 4,367,196 | A | 1/1983 | Wende et al. |
| 9,171,646 | B2* | 10/2015 | Moses .................... G21C 3/626 |
| 9,190,177 | B2 | 11/2015 | Ahlfeld et al. |
| 10,163,537 | B2 | 12/2018 | Hamilton |
| 11,037,687 | B2* | 6/2021 | Choi ...................... G21H 1/103 |
| 2006/0150611 | A1 | 7/2006 | Allen |
| 2007/0148522 | A1 | 6/2007 | Cordelle et al. |
| 2008/0057370 | A1 | 3/2008 | Lee |
| 2013/0059226 | A1 | 3/2013 | Gomi et al. |
| 2014/0116490 | A1 | 5/2014 | Morgan |
| 2015/0110237 | A1 | 4/2015 | Cox et al. |
| 2016/0019991 | A1* | 1/2016 | Dederer ................... G21H 1/10 |
| | | | 376/272 |
| 2017/0133956 | A1 | 5/2017 | Landa et al. |
| 2017/0301422 | A1* | 10/2017 | Kitto ..................... G21C 19/205 |
| 2018/0202057 | A1* | 7/2018 | Sumita ...................... C25C 7/00 |
| 2019/0371582 | A1 | 12/2019 | Clark et al. |
| 2020/0027601 | A1* | 1/2020 | Scott ......................... C25C 3/36 |
| 2020/0274045 | A1 | 8/2020 | Birmingham |

FOREIGN PATENT DOCUMENTS

| | | |
|---|---|---|
| GB | 847902 A | 9/1960 |
| GB | 850876 A | 10/1960 |
| GB | 905559 A | 9/1962 |
| GB | 1018828 A | 2/1966 |
| JP | 2020522681 | 7/2020 |
| KR | 1215115 B1 | 12/2012 |
| WO | 2015160407 A2 | 10/2015 |
| WO | 2018204470 A1 | 11/2018 |

OTHER PUBLICATIONS

Nuclear and Emerging Technologies for Space in Today's Society. abstract only. Austin Lo. Feb. 2019. (Year: 2019).*
Lo, Austin, and Jon Morell. "TOPAZ-II and the HITEC: A Thermionic Reactor Design Comparison." Nuclear Science and Engineering (2022). (Year: 2022).*
USPTO, Non-Final Office Action for U.S. Appl. No. 17/202,952, dated Apr. 28, 2022.
Korean Intellectual Property Office, International Search Report and Written Opinion for PCT/US2021/060350, dated Mar. 15, 2022.
Kamarul Aizat Abdul Khalid et al., Review on Thermionic Energy Converters, IEEE Transactions of Electron Devices, Apr. 29, 2016, vol. 63, No. 6, pp. 2231-2241.
Tilghman, Using Nuclear Waste Heat as Power Source, Submitted as coursework for PH241, Stanford University, Winter 2012 [online], Mar. 19, 2012.
USPTO, Non-Final Office Action for U.S. Appl. No. 17/027,422, dated Jun. 30, 2022.
Dwyer, "Spectral structure of electron antineutrinos from nuclear reactors," Physical review letters, , p. 114, No. 1, 2015: 012502 (Year 2015).
Kopeikin, "Inverse beta decay in nonequilibrium antineutrino flux from a nuclear reactor," Physics of Atomic Nuclei 64, No. 5, 2001, pp. 849-854, (Year 2001).
Huber, "Determination of antineutrino spectra from nuclear reactors," Physical Review C 84, No. 2, 2011, 024617, (Year 2011).
Algora, "Total absorption study of beta decays relevant for nuclear applications and nuclear structure," Nuclear Data Sheets 120, 2014, pp. 12-15, (Year 2014).
Korean Intellectual Property Office, International Search Report and Written Opinion for PCT/US2022/016057, dated Jun. 9, 2022.

* cited by examiner

HEAVY ION PLASMA ENERGY REACTOR

FIELD

The present disclosure relates generally to a heavy ion plasma energy reactor.

BACKGROUND

This section provides background information related to the present disclosure and is not necessarily prior art.

Thermionic Energy Conversion (TEC) systems provide a direct heat to electric energy conversion by generating electricity from thermionic emission. TEC systems provide a benefit over traditional power plants because the TEC system eliminates the dynamic heat to electric energy conversion methods. However, the amount of heat required to generate electric energy in the TEC system is a potential limiting factor. The TEC system utilizes a high amount of heat to emit or boil off electrons from the electron-emitting material.

SUMMARY

This section provides a general summary of the disclosure, and is not a comprehensive disclosure of its full scope or all of its features.

One aspect of the disclosure provides a method of generating electricity. The method includes, generating electricity at a first reactor with a nuclear fuel element. The method also includes removing the nuclear fuel element from the first reactor, and providing the nuclear fuel element at a second reactor. The method also includes generating electricity at the second reactor with the nuclear fuel element.

Implementations of this aspect of the disclosure may include one or more of the following optional features. In some implementations, the nuclear fuel element includes an anode, a cathode, a plasma having a first side facing the cathode and a second side facing the anode, and a nuclear fuel. Optionally, the nuclear fuel may include a neutron-producing material, a neutron-moderating material, and a neutron-consuming material. In some examples, the nuclear fuel produces a first amount of heat at the first reactor and the nuclear fuel produces a second amount of heat at the second reactor. The first amount of heat may be greater than the second amount of heat. In some implementations, the nuclear fuel undergoes fission at the first reactor and the nuclear fuel does not undergo fission at the second reactor. The method may further include, providing an additional anode and an additional cathode at the second reactor. In some examples, the method further includes, providing an additional anode and an additional cathode at the second reactor. The anode has a first surface area, and the additional anode has a second surface area greater than the first surface area. The cathode has a third surface area, and the additional cathode has a fourth surface area greater than the third surface area. Optionally, the method may further include, ionizing the plasma with a charged particle. In some implementations, the method further includes, creating a temperature gradient between the first side of the plasma and the second side of the plasma where a temperature at the first side may be greater than a temperature at the second side.

Another aspect of the disclosure provides a method of generating electricity. The method includes, generating a first amount of electricity at a first reactor with a nuclear fuel element during a first period of time. The nuclear fuel element produces a first amount of heat during the generation of the first amount of electricity. The method also includes, generating a second amount of electricity at the first reactor with the nuclear fuel element during a second period of time. The nuclear fuel element produces a second amount of heat during the generation of the second amount of electricity. The second amount if heat is less than the first amount of heat.

This aspect may include one or more of the following optional features. In some implementations, the first amount of electricity is greater than the second amount of electricity. The nuclear fuel element may include an anode, a cathode, a plasma having a first side facing the cathode and a second side facing the anode, and a nuclear fuel. In some examples, the nuclear fuel includes a neutron-producing material, a neutron-moderating material, and a neutron-consuming material. In some implementations, the nuclear fuel undergoes fission during the first period of time and the nuclear fuel does not undergo fission during the second period of time.

Another aspect of the disclosure provides a system for generating electricity. The system includes, a first reactor configured to generate electricity from a nuclear fuel element during a first period of time. The first reactor includes a first anode and a first cathode, the first anode has a first surface area, and the first cathode has a second surface area. The system also includes, a second reactor configured to generate electricity from the nuclear fuel element during a second period of time following the first period of time. The second reactor includes a second anode and a second cathode. The second anode has a third surface area greater than the first surface area, and the second cathode has a fourth surface area greater than the second surface area.

This aspect may include one or more of the following optional features. In some implementations, the nuclear fuel element includes an anode, a cathode, a plasma having a first side facing the cathode and a second side facing the anode, and a nuclear fuel. The nuclear fuel may include a neutron-producing material, a neutron-moderating material, and a neutron-consuming material. In some examples, the nuclear fuel produces a first amount of heat at the first reactor and the nuclear fuel produces a second amount of heat at the second reactor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
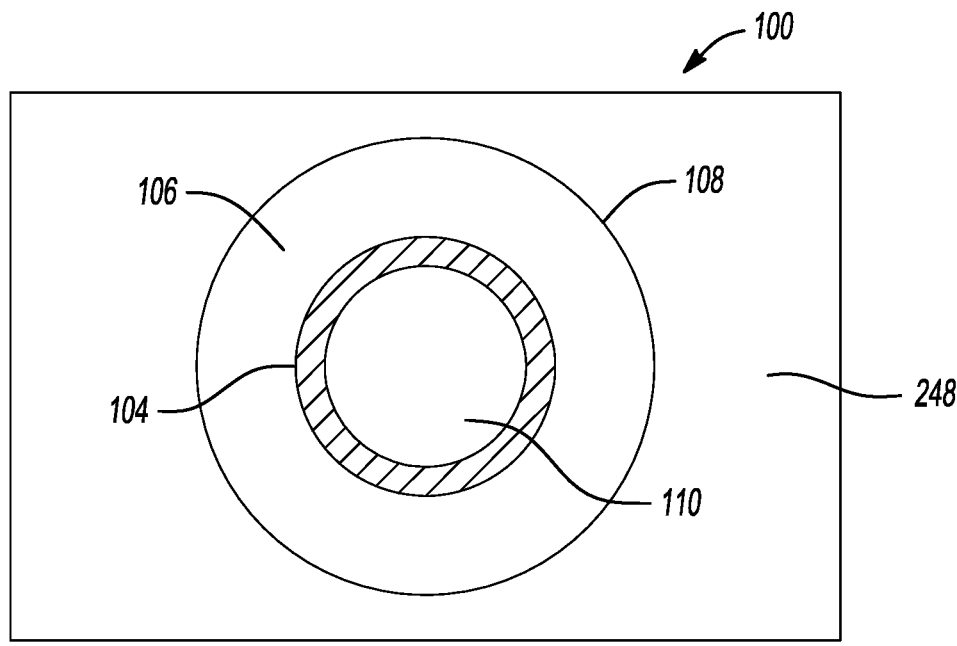
FIG. 1 is a schematic view of a fuel element in accordance with the principles of the present disclosure.

As shown in FIG. 1, an example nuclear fuel element 100 may include a cathode 104, a plasma medium 106, an anode 108, and a nuclear fuel 110. The nuclear fuel element 100, referred to herein as "fuel element 100," conducts electrons 202 from the cathode 104 to the anode 108 through the plasma medium 106 to generate electricity. The nuclear fuel 110, referred to herein as "fuel 110," of the fuel element 100 may include a neutron-producing material, a neutron-moderating material, and a neutron-consuming material described in more detail below.

Figure 2A:
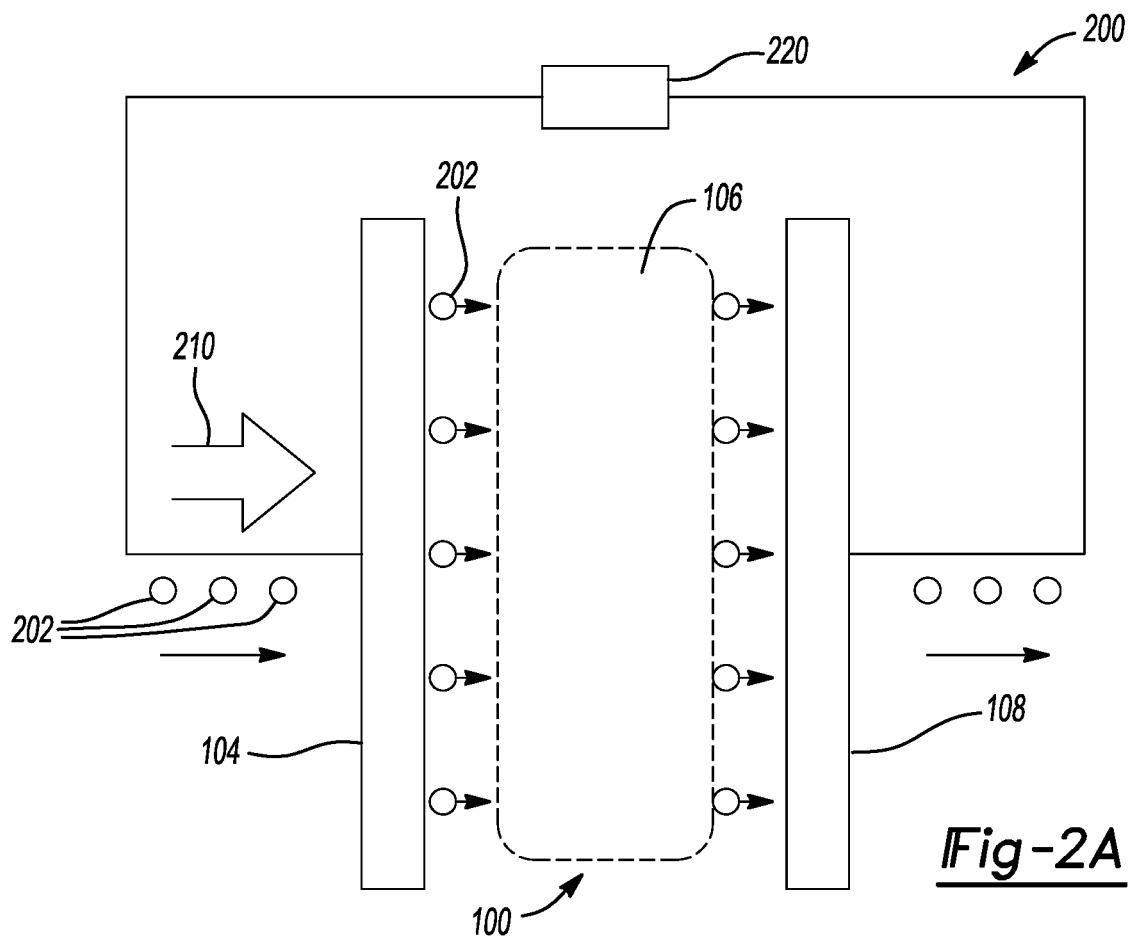
FIG. 2A is a functional block diagram of a thermionic energy conversion system in accordance with the principles of the present disclosure.

As shown in FIG. 2A, an example first reactor 200 uses thermionic energy conversion (TEC) to generate electricity with a nuclear fuel element (e.g., the fuel element 100). In some examples, the first reactor 200 uses heavy ion thermionic emission conversion (HITEC) to generate electricity with the fuel element 100. The first reactor 200 may additionally and/or alternatively use any other TEC system to generate electricity with the fuel element 100.

The first reactor 200 may also include a heat source 210. In some examples, fission generates heat for the heat source 210, as described in more detail below. The first reactor 200 is able to transform heat from the heat source 210 directly into an electrical current by thermionic emission. In some implementations, the cathode 104 of the first reactor may be an emitter, and the anode 108 of the first reactor 200 may be a collector. Electrons 202 in the first reactor 200 travel from the cathode 104 to the anode 108 to produce electrical energy to drive a load 220. In particular, the heat source 210 heats the cathode 104 (e.g., emitter) that emits electrons 202 into the conductive plasma medium 106, referred to herein as "plasma 106." The plasma 106 (e.g., cesium vapor) is a conductive medium allowing the electrons 202 to travel from the cathode 104 across the plasma 106 to the anode 108. The first reactor 200 conducts electrons from the cathode 104 to the anode 108 to produce electricity.

As the first reactor 200 operates, electrons 202 are emitted from the cathode 104 to the medium between the cathode 104 and anode 108. The negative charge of the electrons 202 repels additional electrons 202 and inhibits and/or prevents such additional electrons 202 from leaving the cathode 104 and reaching the anode 108, creating a space charge which reduces the efficiency of the first reactor 200. The plasma 106 increases the efficiency of the first reactor 200 by reducing the negative space charge between the cathode 104 and anode 108. That is, as the negative space charge is neutralized by the plasma 106, additional electrons 202 are more freely emitted from the cathode 104, thus increasing the current flow through the plasma 106 and, in turn, improving the efficiency of the first reactor 200. In this regard, when the plasma 106 of the first reactor 200 is in a natural, pre-ionized state (i.e., a rarified vapor or gas), it may not conduct electrons 202. The plasma 106 may be ionized by coming into contact with the cathode 104, allowing the cathode 104 to transmit the electrons 202 across the plasma 106. In another implementation, the plasma 106 may be ionized by the emitted electron 202 striking a neutral atom of the plasma 106 and ionizing the neutral atom into an additional electron and an ion. The plasma 106 may conduct electrons 202 after the plasma 106 is ionized. When plasma 106 is ionized, electrons 202 are able to conduct from the cathode 104 through the plasma 106 to the anode 108 thereby generating an electrical current. The flow of electrons 202 from the heated cathode 104 to the anode 108 generates electrical energy which may be used to drive the load 220.

Figure 2B:
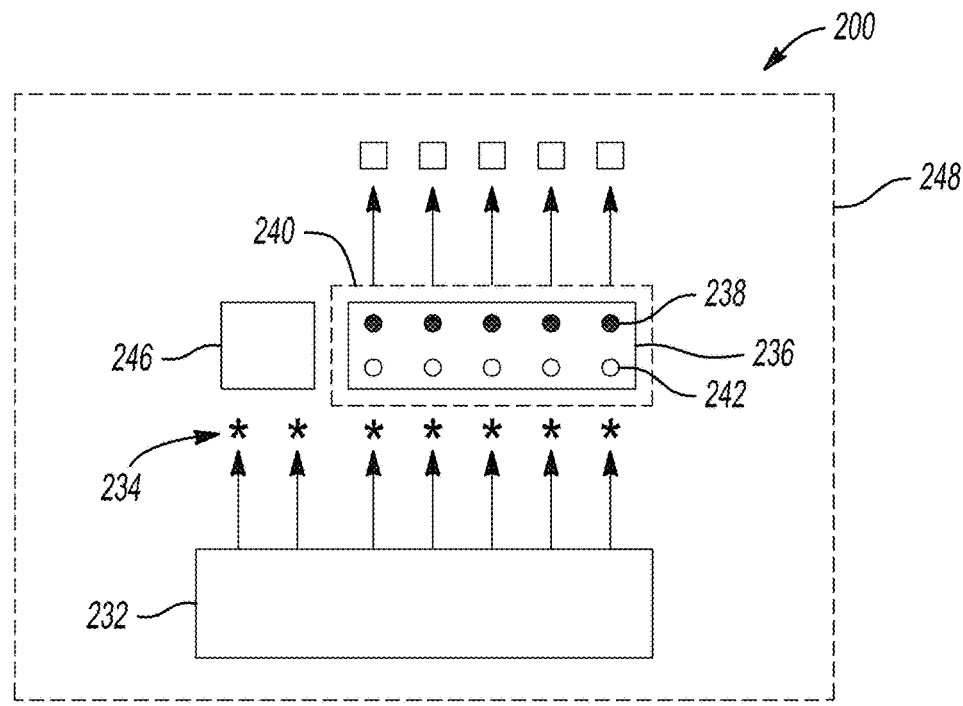
FIG. 2B is a functional block diagram of a fission process in accordance with the principles of the present disclosure.

In other implementations, the plasma 106 of the first reactor 200 may be ionized by fission fragments and/or beta decay particles. As shown in FIG. 2B, the fuel 110 of the fuel element 100 may undergo fission at the first reactor 200. In some examples, the first reactor 200 includes a neutron source 232 to produce neutrons 234. The first reactor 200 may also include a net neutron-producing material 236 that can either be fissile (e.g., U-235)—that is, capable of a fission reaction after absorbing a neutron 234—or fertile (e.g., U-238)—that is, not capable of undergoing a fission reaction after absorbing a neutron 234. When the neutron source 232 produces a neutron 234 that is absorbed by the net neutron-producing material 236 (e.g., U-235) the neutron-producing material 236 becomes unstable splitting into fission fragments 238 and releases several new neutrons 234 in the process. The new neutrons 234 released from fission may themselves undergo fission to create additional fission fragments 238 and release neutrons 234 resulting in a chain reaction. The fission process to create fission fragments 238 additionally produces heat.

In some examples, the heat from fission acts as the heat source 210 for the first reactor 200. That is, the heat produced from fission (e.g., heat source 210), heats the anode to boil off additional electrons 202 from the surface of the cathode 104. The electrons 202 that boil off the cathode 104 conduct through the plasma 106 to the anode 108 to produce electricity that drives the load 220.

In some implementations, the fission fragments 238, generated from fission (e.g., FIG. 2B), may enter the plasma 106 between the cathode 104 and anode 108 to ionize the plasma 106 (e.g., FIG. 2A). The fission fragments 238, by ionizing the plasma 106, allow more electrons 202 to flow from the cathode 104 through the plasma 106 to the anode 108 to generate electricity. The fuel 110 may include a thin cladding 240 such that the fission fragments 238 are not able to escape the fuel 110 and enter the plasma 106 of the first reactor 200. In some examples, the fuel 110 is unclad, such that the fission fragments 238 are free to escape the fuel 110 and enter the plasma 106 of the first reactor 200.

The fission fragments 238, generated by fission, may further undergo a beta decay process. In particular the fission fragment 238 generated by fission, undergoes beta decay where the fission fragment 238 converts one of its neutrons 234 into a proton 242 by releasing an additional electron referred to herein as a "beta decay particle 244." The beta decay particle 244, generated from beta decay of the fission fragment 238, may enter the plasma 106 between the cathode 104 and anode 108 to ionize the plasma 106. The beta decay particles 244 by ionizing the plasma 106 of the first reactor 200 allow more electrons 20 to flow from the cathode 104 to the anode 108 to generate electricity. The beta decay particle 244 is able to escape the fuel 110 of the fuel element 100 whether the fuel 110 has a thin cladding 240 or the fuel 110 is unclad.

As illustrated in FIG. 2B, the fuel 110 of the fuel element 100 may include a neutron-consuming material 246 and a neutron-moderating material 248. The neutron-moderating material 212 reduces the velocity of the neutrons 234 released from the neutron-producing material 236. For example, as the neutron source 232 produces neutrons 234 that are absorbed by the neutron-producing material 236 or neutron-consuming material 246, the neutron of the neutron-producing material 236 becomes unstable splitting into fission fragments 238 and may release several new neutrons 234 to stabilize. The released neutrons 234 from fission may travel at a high velocity, resulting in a low likelihood of absorption by the neutron-producing material 236 or neutron-consuming material 246.

In some implementations, the neutron-moderating material 248 resides in the fuel 110 of the fuel element 100. In other implementations, the neutron-moderating material 248 resides outside of the fuel 110 of the fuel element 100. That is the neutron-moderating material 248 may surround the fuel 110 of the fuel element 100. The neutron-moderating material 248 (e.g., graphite, water, or Zirconium Hydride) reduces the velocity of the fast neutrons 234 produced by fission, thus increasing the likelihood that the released neutrons 234 are absorbed by the neutron-producing material 236 and neutron-consuming material 246, which, in turn, can result in the production of more fission fragments 238. As the velocity of more neutrons 234 produced by the fission process is reduced by the neutron-moderating material 248, resulting in the absorption of more neutrons 234 by the neutron-producing material 236 and the production of more fission fragments 238, the first reactor 200 becomes less dependent on the neutron source 232 to start the fission chain reaction, thus increasing the efficiency of the first reactor 200.

The first reactor 200 relies on the heat source 210 (e.g., fission) to produce heat to emit electrons 202 to produce electricity. That is, when fission no longer occurs at the first reactor 200 electrons 202 no longer emit from the anode 108 to conduct across the plasma 106 to the cathode 208 to produce electricity. Thus, when the fuel 110 of the fuel element 100 no longer fissions to produce heat, the first reactor 200 no longer produces electricity by thermionic emission. In particular, the fuel 110 of the fuel element 100 needs to fission to produce electricity by thermionic emission at the first reactor 200. The total current at the cathode 104 is represented by the following equations:

$$I = I_{th} + I_{i,C} - I_{e,C}\exp\left(-\frac{V_{p,C} - V_C}{T_{e,C}}\right), \quad (1)$$

-continued $$V_C < V_{p,C}$$

and $$I = (I_{th} + I_{i,C})\exp\left(-\frac{V_C - V_{p,C}}{T_C}\right) - I_{e,C}, \quad (2)$$

$$V_C > V_{p,C}.$$

In equations 1 and 2, $I_{th}$ represents the thermionic current, $I_{i,C}$ represents the ion current at the cathode 104, $I_{e,C}$ represents the electron current at the cathode 104, $V_{p,C}$ represents the voltage potential between the plasma 106 and the cathode 104, $V_C$ represents the voltage potential at the cathode 104, $T_{e,C}$ represents the temperature of the electrons at the cathode 104, and $T_C$ represents the temperature of the cathode 104. Equation 1 represents the current at the cathode 104 when the voltage potential at the cathode 104 is less than the voltage potential between the plasma 106 and the cathode 104. Equation 2 represents the current at the cathode 104 when the voltage potential at the cathode 104 is greater than the voltage potential between the plasma 106 and the cathode 104. The total current at the anode 108 is represented by the following equations:

$$I = I_{e,A}\exp\left(-\frac{V_{p,A} - V_A}{T_{e,A}}\right) - I_{i,A}, \quad (3)$$

$$V_A < V_{p,A}$$

and $$I = I_{e,A} - I_{i,A}\exp\left(-\frac{V_A - V_{p,A}}{T_A}\right), \quad (4)$$

$$V_A > V_{p,A}.$$

In equations 3 and 4, $I_{e,A}$ represents the electron current at the anode 108, $V_{P,A}$ represents the voltage potential between the plasma 106 and the anode 108, $V_A$ represents the voltage potential at the anode 108, $T_{e,A}$ represents the temperature of the electrons at the anode 108, and $T_A$ represents the temperature of the anode 108.

Figure 3A:
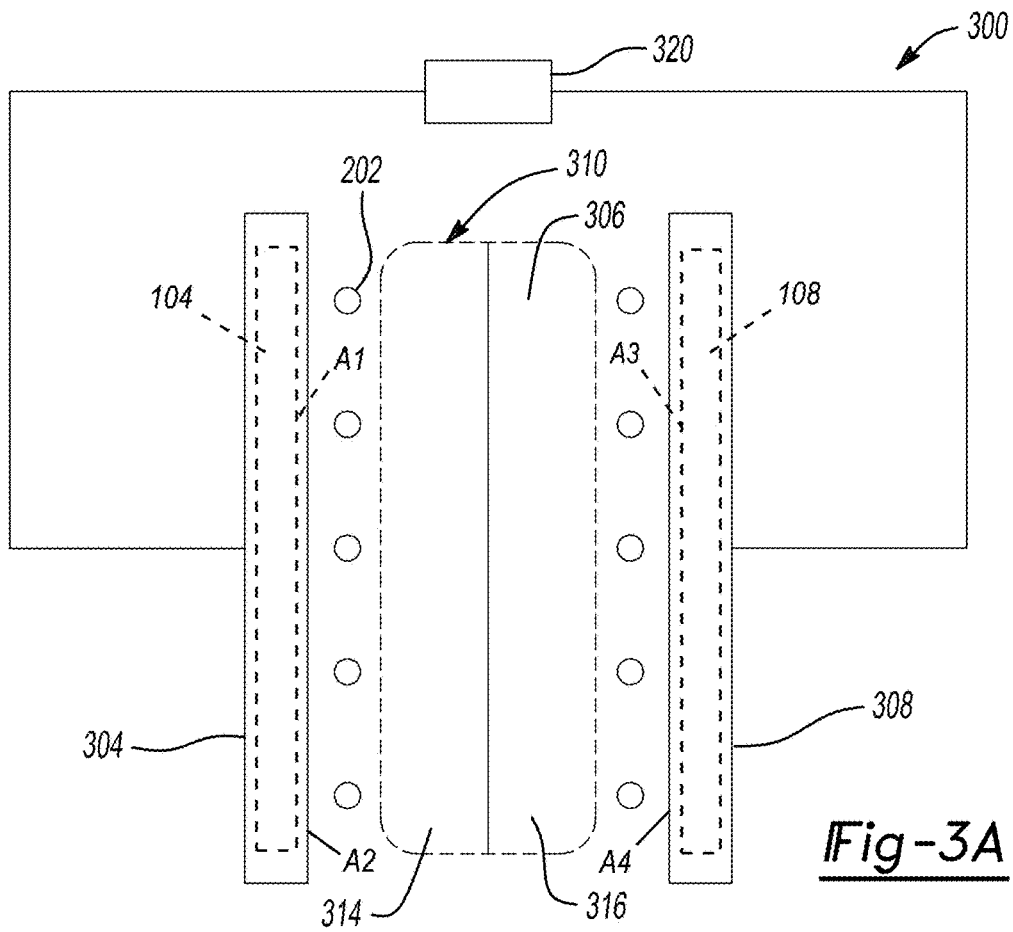
FIG. 3A is a functional block diagram of a plasma energy conversion system in accordance with the principles of the present disclosure.

As shown in FIG. 3A, an example second reactor 300 uses plasma energy conversion to generate electricity with the fuel element 100. In some examples, the second reactor 300 includes a heavy ion plasma energy reactor (HIPER). The second reactor 300 may additionally and/or alternatively include any other plasma energy conversion system to generate electricity with the fuel element 100. The second reactor 300 may include a cathode 304, a plasma 306, and an anode 308 which may be substantially similar to the anode 108, plasma 106, and cathode 104 of the first reactor 200 except as otherwise shown or described herein. In some examples, the second reactor 300 does not require a heat source (e.g., heat source 210 of the first reactor 200) to operate. In these examples, in particular, the second reactor 300 does not require the fuel 110 of the fuel element 100 to fission to produce electricity. That is, the second reactor 300 may produce electricity with the fuel element 100 when fission does not occur, described in more detail below.

The plasma 306 of the second reactor 300 includes a quantity of positively charged ions 318 and a quantity of electrons 202. The quantity of positively charged ions 318 equals the quantity of electrons 202 such that the plasma 306 is charge neutral (e.g., neither a net positive charge nor a net negative charge). In some examples, the plasma 306 maintains a neutral charge by a dissociative recombination reaction where positively charged ions 318 recombine with electrons 202 creating a neutral molecule 312. This recombination of electrons 202 with positively charged ions 318 helps keep the plasma 306 charge neutral.

Dissociative recombination of the positively charged ions 318 and electrons 202 occurs at a certain rate, referred to herein as a "recombination rate". This recombination rate may be dependent on both a temperature of the plasma 306 (e.g., temperature of the gas) and a temperature of the electron 202. In some examples, the temperature of the plasma 306 is different than the temperature of the electron 202. In other examples, the temperature of the plasma 306 is the same or substantially the same as the temperature of the electron 202. For example, when the plasma 306 is heated to a high temperature the mobility rate of the electron 202 may increase. As the mobility rate of the electron 202 increases, the likelihood that the electron 202 will recombine with the positively charged ions 318 may be reduced. In another example, when the plasma 306 is cold the mobility rate of the electron 202 may decrease. As the mobility rate of the electron 202 decreases, the likelihood that the electron 202 will recombine with the positively charged ion 318 may increase. Thus, when the temperature of the plasma 306 is hot, the recombination rate is lower than the recombination rate when the temperature of the plasma 306 is cold.

As illustrated in FIG. 3A, the second reactor 300 (e.g., HIPER) may also include a first side 314 of the plasma 306 facing the cathode 304, and a second side 316 of the plasma 306 facing the anode 308. During operation of the second reactor 300, the cathode 304 may be at a first temperature T1, and the anode 308 may be at a second temperature T2 that is less than the first temperature T1. The second reactor 300 may bring the cathode to the first temperature T1 and the anode to the second temperature T2 by a heat source. In some examples, the heat source for the second reactor 300 may include heat from a fission reaction of the fuel element 100. In other examples, where the fuel element 100 no longer fissions, the heat source for the second reactor 300 may include heat from an auxiliary heat source (e.g., electric heat source). The heat at the second reactor 300 may be transferred via heat pipes. By heating the cathode 304 to temperature T1 and the anode 308 to temperature T2, the first side 314 of the plasma 306 reaches a temperature T3, and the second side 316 of the plasma 306 reaches a temperature T4. The temperature T3 of the first side 314 of the plasma 306 is greater than the temperature T4 of the second side 316 of the plasma 306. The difference between the temperatures T3, T4 of the first and second sides 314, 316 of the plasma 306 creates a temperature gradient between the first side 314 of the plasma 306 and the second side 316 of the plasma 306. In particular, the temperature of the plasma 306 may gradually decrease between the first and second sides 314, 316 from T3 to T4.

The difference between the temperatures T3, T4 initiates a difference in the recombination rate between the first side 314 of the plasma 306 and the second side 316 of the plasma 306. In some implementations, the difference between the temperatures T3, T4 causes a lower recombination rate for the first side 314 of the plasma 306 than the second side 316 of the plasma 306. In particular, the higher temperature T3 of the first side 314 of the plasma 306 may produce a recombination rate R1, while the lower temperature T4 of the second side 316 of the plasma 306 may produce a recombination rate R2. The recombination rate R1 is lower than the recombination rate R2 because temperature T3 is greater than temperature T4.

The difference between the recombination rate R1 for the first side 314 of the plasma 306 and the recombination rate R2 for the first side 314 of the plasma 306, may cause a higher electron density for first side 314 of the plasma 306 than the second side 316 of the plasma 306. Therefore, the density of electrons 202 may be greater at the first side 314 of the plasma 306 than at the second side 316 of the plasma 306. For example, because the recombination rate R1 is lower than the recombination rate R2, fewer electrons 202 in the first side 314 of the plasma 306 recombine with positively charged ions 318 to create the neutral molecule 312. That is, because fewer electrons 202 recombine with positively charged ions 318 in the first side 314 of the plasma 306, there is a greater quantity of electrons 202 remaining in the first side 314 of the plasma 306. In contrast, because a greater quantity of electrons 202 recombine with positively charged ions 318 in the second side 316 of the plasma 306, there is a lesser quantity of electrons 202 remaining in the second side 316 of the plasma 306. This difference in the quantity of electrons 202 between the first and second sides 314, 316 of the plasma 306 creates a density gradient of electrons 202 across the plasma 306. In particular, the density of electrons 202 on the first side 314 of the plasma 306 may be greater than the density of the electrons 202 on the second side 316 of the plasma 306. The density gradient of electrons 202 is caused by the smaller quantity of electrons 202 on the first side 314 of the plasma 306 recombining with positively charged ions 318 relative to the quantity of electrons 202 on the second side 316 of the plasma 306 recombining with positively charged ions 318. This density gradient of electrons 202 results in more electrons 202 in the first side 314 of the plasma 306 compared to the second side 316 of the plasma 306.

Figure 3B:
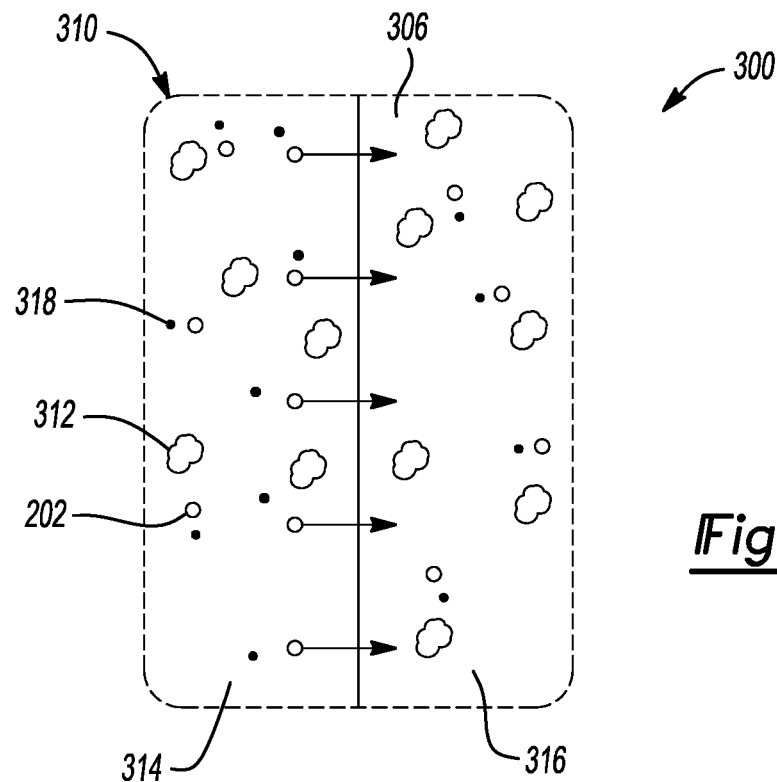
FIG. 3B is an exploded view of the plasma from the plasma energy conversion system of FIG. 3A.

FIG. 3B illustrates an expanded view of the plasma 306 in FIG. 3A. The plasma 306 has an electron density gradient between the first side 314 of the plasma 306 and the second side 316 of the plasma 306. As shown in FIG. 3B, there is a greater quantity of electrons 202 in the first side 314 of the plasma 306 than in the second side 316 of the plasma 306. This electron density gradient creates a charge difference between the first side 314 of the plasma 306 and the second side 316 of the plasma 306. In order to maintain a neutral charge, the plasma 306 may eliminate the electron density gradient between the first side 314 of the plasma 306 and the second side 316 of the plasma 306. For example, the plasma 306 may eliminate the electron density gradient by transmitting electrons 202 from the cathode 304 to the anode 308 through the plasma 306. In other examples, electrons 202 transmit from the first side 314 of the plasma 306 to the second side 316 of the plasma 306 to eliminate the electron density gradient. This transmission of electrons 202 from the first side 314 of the plasma 306 to the second side 316 of the plasma 306 balances the quantity of electrons 202 on the first side 314 of the plasma 306 and the second side 316 of the plasma 306.

In some implementations, the flow of electrons 202 between the first side 314 of the plasma 306 and the second side 316 of the plasma 306 is continuous to balance the charge difference between the first side 314 of the plasma 306 and the second side 316 of the plasma 306. That is, as the flow of electrons 202 from the first side 314 of the plasma 306 to the second side 316 of the plasma 306 balances the charge difference in the plasma 306, the difference between the recombination rates R1 and R2 continues to create a charge concentration in the plasma 306. For example, the recombination rate R1 for the first side 314 of the plasma 306 continues to be less than the recombination rate R2 for the second side 316 of the plasma 306 because the temperature T3 is greater than the temperature T4. Thus, even as the flow of electrons 202 balances the charge difference in the plasma 306, the difference in recombination rate R1 and R2 continues to produce a charge difference between the first side 314 of the plasma 306 and the second side 316 of the plasma 306. The continuous flow of electrons 202 between the first side 314 of the plasma 306 and the second side 316 of the plasma 306 is needed to maintain the neutral charge across the plasma 306. This continuous flow of electrons 202 across the plasma 306 produces an electric current, to drive the load 320.

FIG. 3A also includes the sheath 310 that surrounds the conductive material of the plasma 306. The sheath 310 may include a positively charged ion 318 density that is greater than the electron 202 density in the sheath 310. The greater density of positively charged ions 318 in the sheath 310 happens because the weight of the electron 202 is less than the weight of the ion 318. The lower weight of the electron 202 allows the electron 202 to be more mobile than the ion 318. In particular, the relationship of the mass of the electron 202 and the mass of the positively charged ion 318 with the respective velocity of the electron 202 and the velocity of the positively charged ion 318 may be represented by:

$$\frac{v_e}{v_i} \propto \sqrt{\frac{m_i}{m_e}}. \tag{5}$$

In equation 5, $v_e$ represents the velocity of the electron 202 and $v_i$ represents the velocity of the positively charged ion 318. Typical values in equation 5 may include $$\frac{v_e}{v_i} > 150.$$

The increased mobility of the electron 202 relative to the mobility of the ion 318 allows the electron to escape the plasma 306 onto the surface (e.g., surface 308a) of the anode 308. The ions 318 may remain in the sheath 310 because the ions 318 are not mobile enough to escape the plasma 306 onto the surface (e.g., surface 308a) of the anode 308, creating a density of ions 318 in the sheath 310 that is greater than the density of the electrons 202 in the sheath 310. The greater density of ions 318 on the sheath 310 creates an electric field between the sheath 310 and the cathode 304 and between the sheath 310 and the anode 308. In some examples, the electric field between the sheath 310 and the cathode 304 and between the sheath 310 and the anode 308 prevents additional electrons 202 from leaving the plasma 306.

In some implementations, the second reactor 300 may operate with the temperature T3 of the first side 314 of the plasma 306 is the same as the temperature T4 of the second side 316 of the plasma 306. That is, there is no temperature gradient between the first side 314 of the plasma 306 and the second side 316 of the plasma 306. In some examples, the second reactor 300 utilizes a beta decay particle 244 to ionize the plasma 306. In particular, the beta decay particle 244 ionizes the plasma 306 to allow the second reactor 300 to extract electrons 202 from the plasma 306.

Figure 4:
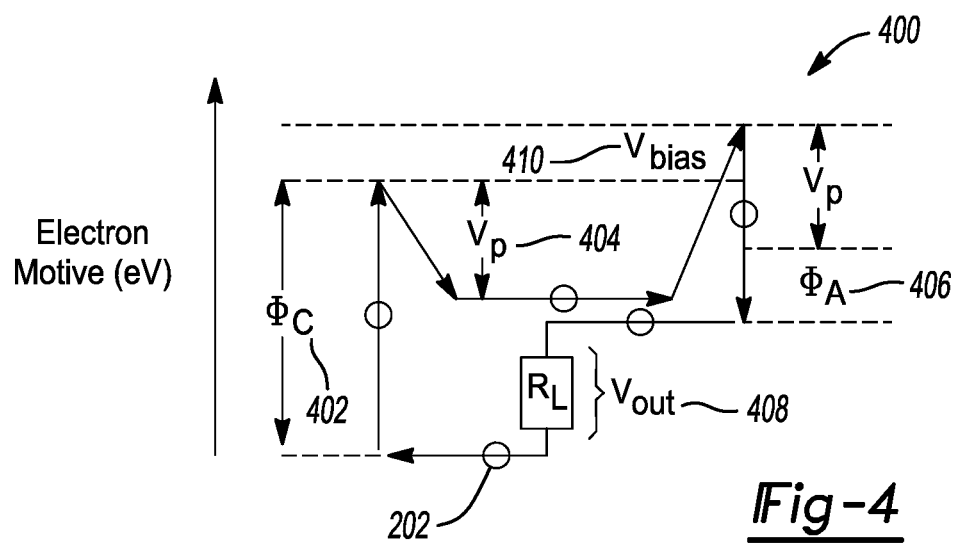
FIG. 4 is a diagram of work done by an electron in either a thermionic energy conversion system or plasma energy conversion system.

FIG. 4 illustrates work done by the electron 202 travelling through the fuel element 100. The Y-axis represents electron motive (eV) increasing from bottom to top. The X-axis of the figure represents the space that the electron 202 travels through in the fuel element 100. The implementations below describe the work done by the electron 202 travelling through the fuel element 100 at the first reactor 200. It can be appreciated by those skilled in the art that the implementations below may describe work done by the electron 202 travelling through the fuel element 100 at the second reactor 300. The electron 202 starts at the cathode 104 where a force is applied to the electron 202 to keep the electron 202 constrained to the surface of the cathode 104. The cathode 104 and the anode 108 each include a specific work function. For example, the cathode 104 may include a corresponding work function $\Phi_C$ 402 and the anode 108 may include a corresponding work function $\Phi_A$ 406. In some implementations, the work function $\Phi_C$ 402 is greater than the work function $\Phi_A$ 406. The total potential that may be applied to the reactor to extract power is:

$$v_{out} = fV_{p,bias} + \Phi_C - \Phi_A \tag{6}.$$

In equation 6, f represents any fraction that is less than 1 and $V_{p,bias}$ is the plasma 106, 306 potential difference between the cathode 104, and the anode 108. The electron 202 works against the force of the cathode 104 to emit from the surface of the cathode 104 at electron motive $\Phi_C$ 402. For example, the first reactor 200 may utilize heat from the heat source 210 (e.g., fission) to provide the electron 202 with the electron motive $\Phi_C$ 402 to emit from the cathode 104.

After emission from the cathode 104, the electron 202 may enter the plasma 106 where the electric field of the plasma 106 does work $V_p$ 404 against the electron 202. The work $V_p$ 404 done against the electron 202 reduces the amount of electron motive $\Phi_C$ 402 that the electron 202 had when entering the plasma 106. After entering the plasma 106, the electron 202 may conduct through the plasma 106 toward the anode 108. In some implementations, the electron 202 does not experience any loss of electron motive while travelling through the plasma 106. In some implementations, the electron 202 loses electron motive while travelling through the plasma 106.

After travelling through the plasma 106, the electron 202 exits the plasma 106 and reaches the anode 108. The work done against the electron 202 to bring the electron down into the conduction band of the anode 108 is represented by $\Phi_A$ 406. That is, the electric field of the anode 108 (e.g., potential of the anode 108) does work $\Phi_A$ 406 against the electron 202 to bring the electron into the conduction band of the anode 108. From the anode 108, the electron 202 drives the load 220, 320 with an electron motive $V_{out}$ 408. Optionally, a voltage (e.g., $V_{bias}$ 410) may be applied to the electron 202 before reaching the cathode 104. $V_{bias}$ 410 increases the electron motive of the electron 202, allowing the electron 202 to produce more electrical energy at $V_{out}$ 408. The increased amount of electrical energy the electron 202 produces may be proportional to the amount of $V_{bias}$ 410 applied. In some examples $V_{out}$ 408 is equal to the summation of $V_{bias}$ 410 and $\Phi_A$ 406. In other examples, where no $V_{bias}$ is applied, $V_{out}$ 408 is equal to $\Phi_A$ 406. For maximum power output for the first reactor 200, the amount of $V_{bias}$ 410 applied at the first reactor 200 is represented by:

$$V_{bias} = \begin{cases} T_e \ln\left[A\frac{(1+R/\mu - I/I_{th})}{(AR/\mu - I/I_{th})}\right], & V_E < V_p \\ T_E \ln\left(\frac{1+R/\mu}{R+I/I_{th}}\right) - T_e \ln\left(\frac{I/I_{th} + AR/\mu}{AR}\right), & V_E > V_p \end{cases} \tag{7}$$

For maximum power for the second reactor 300, the amount of $V_{bias}$ 410 applied at the second reactor 300 is represented by:

$$V_{bias} = \begin{cases} T_e \ln\left[A \frac{(1/\mu - I/I_{e,E})}{(A/\mu - I/I_{e,E})}\right], & V_E < V_p \\ T_E \ln\left(\frac{1/\mu}{1 + I/I_{e,E}}\right) - T_e \ln\left(\frac{A/\mu + I/I_{e,E}}{A}\right), & V_E > V_p \end{cases} \quad (8)$$

In equations 7 and 8, A represents the ratio of the anode surface area to the cathode surface area, R represents the ratio of plasma electron current to the thermionic current, and µ represents the ratio of the plasma electron current to the ion current.

Figure 5A:
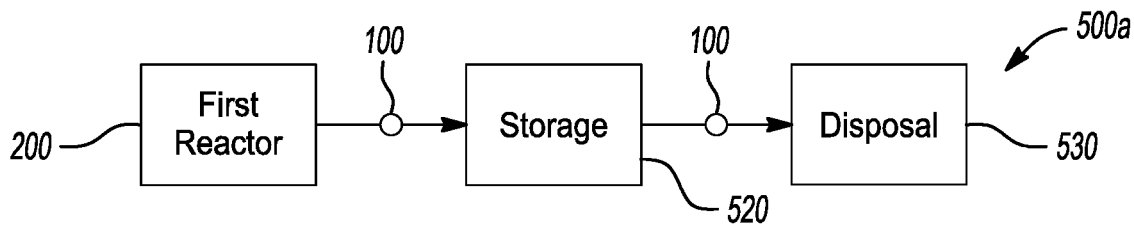
FIGS. 5A and 5B are functional block diagrams of a nuclear system for a fuel element.

FIG. 5A illustrates a nuclear system 500a for a nuclear fuel element (e.g., the fuel element 100). The nuclear system 500a for the fuel element 100 may include a first reactor (e.g., first reactor 200) generating electricity with the fuel element 100. The first reactor 200 may generate electricity with the fuel element 100 using any TEC system (e.g., HITEC) as described above in FIGS. 2A and 2B. While operating the first reactor 200, the fuel 110 of the fuel element 100 becomes depleted and needs to be refueled. That is, as the first reactor 200 operates, the fuel 110 of the fuel element 100 undergoes fission to produce heat necessary for the first reactor 200 to produce electricity. The neutron-producing material 236, neutron-consuming material 246, and neutron-moderating material 248 of the fuel 110 deplete as the first reactor 200 operates to undergo fission. Once the neutron-producing material 236, neutron-consuming material 246, and neutron-moderating material 248 are fully depleted, the fuel 110 can no longer sustain the fission reaction. Thus, as described above with reference to FIGS. 2A and 2B, once the fuel 110 of the fuel element 100 is no longer undergoing the fission reaction, the first reactor 200 is no longer able to produce electricity by thermionic emission.

Once the fuel 110 of the fuel element 100 becomes depleted, the fuel 110 may be refueled a limited number of times such that the fuel 110 may continue to produce heat for fission. After the limited number of refuels, the fuel 110 of the fuel element 100 may no longer be refueled (e.g., the fuel element 100 is "burnt up"). That is, the fuel 110 may not be refueled to continue to undergo the fission reaction at the first reactor 200 after the fuel element 100 is burnt up. Because the fuel 110 is no longer able to be refueled, the fuel element 100 can no longer undergo the fission reaction to produce heat for the heat source 210 to sustain the thermionic emission of the first reactor 200. Once the fuel element 100 becomes burnt up, the fuel element 100 may be removed from the first reactor 200 and placed in a storage facility 520 of the system 500a.

At the storage facility 520, the fuel element 100 may continue to radioactively decay without producing electricity. In particular, while the fuel 110 of the fuel element 100 no longer undergoes fission, the fuel 110 continues to produce beta decay particles 244 (e.g., nuclear waste). The fuel element 100 may remain in the storage facility 520 until the fuel element 100 no longer radioactively decays (e.g., through the production of beta decay particles 244). In some implementations, the fuel element 100 may radioactively decay in storage for fifty years. In other implementations, the fuel element 100 may radioactively decay in storage for a time period longer or shorter than 50 years. While in storage, no electricity is produced by the fuel element 100.

Once the radioactivity of the fuel element 100 falls below a threshold at the storage facility 520, the fuel element 100 may be removed from the storage facility and placed in a disposal facility 530. The fuel element 100 may remain at the disposal facility 530 indefinitely while not producing electricity.

The system 500a only produces electricity from the fuel element 100 at the first reactor 200. The system 500a does not produce electricity with the fuel element 100 after the fuel element 100 is removed from the first reactor 200. Additionally, system 500a does not produce electricity at the first reactor 200 with the fuel element 100 after the fuel 110 of the fuel element 100 is burnt up.

Figure 5B:
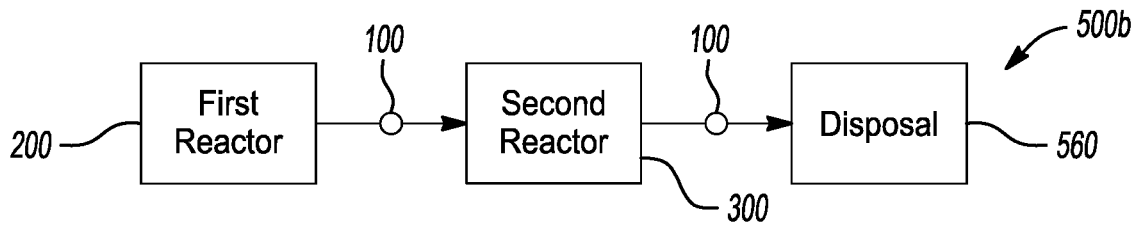

FIG. 5B illustrates another implementation of a nuclear system 500b for generating electricity with the fuel element 100. The system 500b may include a first reactor (e.g., the first reactor 200), a second reactor (e.g., the second reactor 300), and a disposal facility 560. In some examples of the system 500b, the first reactor 200 generates electricity with the fuel element 100 at the first reactor 200. For example, the first reactor 200 may produce a first amount of electricity with the fuel element 100 using any TEC system. In some implementations, the fuel 110 produces a first amount of heat at the first reactor 200. The first reactor 200 may produce electricity with the fuel element 100 in a way that is substantially similar to the first reactor of the system 500a. Once the fuel 110 of the fuel element 100 is burnt up, the fuel element 100 may be removed from the first reactor 200. The fuel element 100 may be provided at the second reactor 300 of the system 500b after removing the fuel element 100 from the first reactor 200.

The second reactor 300 may generate a second amount of electricity with the fuel element 100 after generation of the first amount of electricity with the fuel element 100 at the first reactor 200. The fuel element 100 may continue to produce beta decay particles 244 at the second reactor 300 without undergoing a fission reaction. The beta decay particles 244 may ionize the plasma 306 of the second reactor 300. In some implementations, the fuel 110 produces a second amount of heat at the second reactor 300. The second amount of heat may be less than the first amount of heat. For example, the fuel element 100 may undergo fission at the first reactor 200 to produce heat for the heat source 210. Once the fuel element 100 no longer undergoes fission, the fuel element 100 is provided to the second reactor 300 where the fuel element 100 no longer undergoes fission to produce heat. Thus, in this implementation, the first amount of heat produced at the first reactor 200 is greater than the second amount of heat produced at the second reactor 300, because the fuel element 100 no longer undergoes fission at the second reactor 300.

In some examples of the system 500b, the second amount of electricity produced by the second reactor 300 is less than the first amount of electricity produced by the first reactor 200. In particular, the fuel 110 of the fuel element 100 undergoes a fission reaction at the first reactor 200 which produces the first amount of heat (e.g., heat source 210) to boil or otherwise emit electrons 202 off of the cathode 104 (e.g., emitter). The electrons 202 are conducted from the cathode 104 through the plasma 106 to the anode 108 producing the first amount of electricity to drive the load 220. In contrast, the fuel 110 of the fuel element 100 no longer undergoes a fission reaction at the second reactor 300, which produces the second amount of heat that is less than the first amount of heat. The second amount of heat at the second reactor 300 does not exceed the amount of heat required to boil or otherwise emit the electrons 202 off of the cathode 304 of the second reactor 300. Specifically, the second reactor 300 may not emit electrons 202 from the cathode 304 (e.g., no thermionic emission) to produce electricity. Rather, the second reactor 300 may generate the second amount of electricity by random movement of the electrons 202 in the plasma 306 and/or by creating the temperature gradient of the plasma 306 as discussed relative to FIGS. 3A and 3B. The second amount of electricity may be less than the first amount of electricity because the second reactor 300 does not generate electricity by thermionic emission.

In some implementations, the second amount of electricity produced at the second reactor 300 may be increased by providing an additional cathode 304 and an additional anode 308 at the second reactor. That is, the second reactor 300 may include an additional cathode 304 and an additional anode 308 as compared to the first reactor 200. The second reactor 300 may include any number of cathodes 304 and any number of anodes 308. By providing additional cathodes 304 and anodes 308 at the second reactor 300, the total surface area of the cathodes 304 and anodes 308 can be increased. The increased surface area of the cathodes 304 and anodes 308 can increase the second amount of electricity produced by the second reactor 300. Specifically, the increased surface area of the anode 308 allows more electrons 202 to enter the surface of the anode 308. Because more electrons 202 may enter the surface of the anode 308 with the increased surface area, the second reactor 300 generates more electricity. The first reactor 200 and second reactor 300 may include any number of anodes 108, 308 and any number of cathodes 104, 304.

In some examples, the cathode 104 at the first reactor 200 has a first surface area A1 (e.g., FIG. 3A), and the additional cathode 304 at the second reactor 300 has a second surface area A2 (e.g., FIG. 3A) greater than the first surface area A1. Additionally, the anode 108 at the first reactor 200 has a third surface area A3 (e.g., FIG. 3A), and the additional anode 308 at the second reactor 300 may have a fourth surface area A4 (e.g., FIG. 3A) greater than the third surface area A3. For example, the second surface area of the additional cathode 304 may be greater than the first surface area of the cathode 104 because the additional cathode 304 uses advanced surface area techniques. In this example, the fourth surface area of the additional anode 308 may also be greater than the third surface area of the anode 108 because the additional cathode 304 also uses advanced surface area techniques. For example, advanced surface area techniques may include creating grooves or bumps on the surface of the anode 308. The grooves or bumps on the surface of the anode 308 are configured to increase surface area between the sheath 310 and the surface area of the anode 308. Specifically, the second reactor 300 collects the current through the interaction between the sheath 310 and the surface of the anode 308. That is, by increasing the interaction (e.g., surface area) between the sheath 310 and the surface of the anode 308 the current output of the second reactor 300 may also increase. By increasing the surface area of the anode 308 by advanced surface area techniques or providing additional anodes 308, the interaction between the sheath 310 and the surface of the anode 308 increases thereby increasing the current output of the second reactor 300. The advanced surface area techniques of the anode 308 may additionally or alternatively apply to the surface area of the cathode 304.

In examples, the first reactor 200 may not utilize the advanced surface area techniques for the cathode 104 and anode 108 because the first reactor 200 uses fission for the heat source 210 to boil off electrons 202 from the surface of the cathode 104 to generate electricity. The heat source 210 produces the first amount of heat that a cathode 104 and anode 108 using high surface area techniques are not able to survive. For example, the microstructures created by the advanced surface area techniques described above in the presence of heat from fission (e.g., first amount of heat at the first reactor) and fission fragments from fission would likely destroy the microstructures created by the advanced surface area techniques. Thus, reactors that utilize TEC (e.g., first reactor) may not utilize the advanced surface area techniques for the cathode 104 and anode 108.

In some examples of the system 500b, rather than removing the fuel element 100 from the first reactor 200 and providing the fuel element 100 at the second reactor 300, the fuel element 100 may remain at the first reactor. That is, the first reactor 200 may generate the first amount of electricity with the fuel element 100, as described above, during a first time period. For example, during the first time period, the first reactor 200 may generate electricity using any TEC system (e.g., HITEC, as previously described) where the fuel element 100 produces the first amount of heat during the generation of the first amount of electricity. In this example, after the fuel 110 of the fuel element 100 no longer undergoes a fission reaction at the first reactor 200, the first reactor 200 may generate a second amount of electricity with the fuel element 100 during a second period of time. During the second period of time, the first reactor 200 may generate electricity with the fuel element 100 using any plasma conversion system (e.g., HIPER, as previously described) where the fuel element 100 produces the second amount of heat during the generation of the second amount of electricity.

Here, the first amount of electricity is greater than the second amount of electricity and the first amount of heat is greater than the second amount of heat. For example, once the fuel element 100 no longer undergoes a fission reaction at the first reactor 200 using HITEC, the first reactor 200 may convert to using HIPER to generate electricity at the first reactor 200. The conversion of the first reactor 200 from using HITEC to HIPER may include turning off the neutron source 232 and creating a temperature gradient for the plasma 106. The fuel element 100 may be (i) removed from the first reactor 200 or the second reactor 300 after the fuel 110 of the fuel element 100 no longer produces beta decay particles 244, and (ii) placed in the disposal facility 560. In the disposal facility 560, the fuel element 100 no longer generates electricity.

Figure 6A:
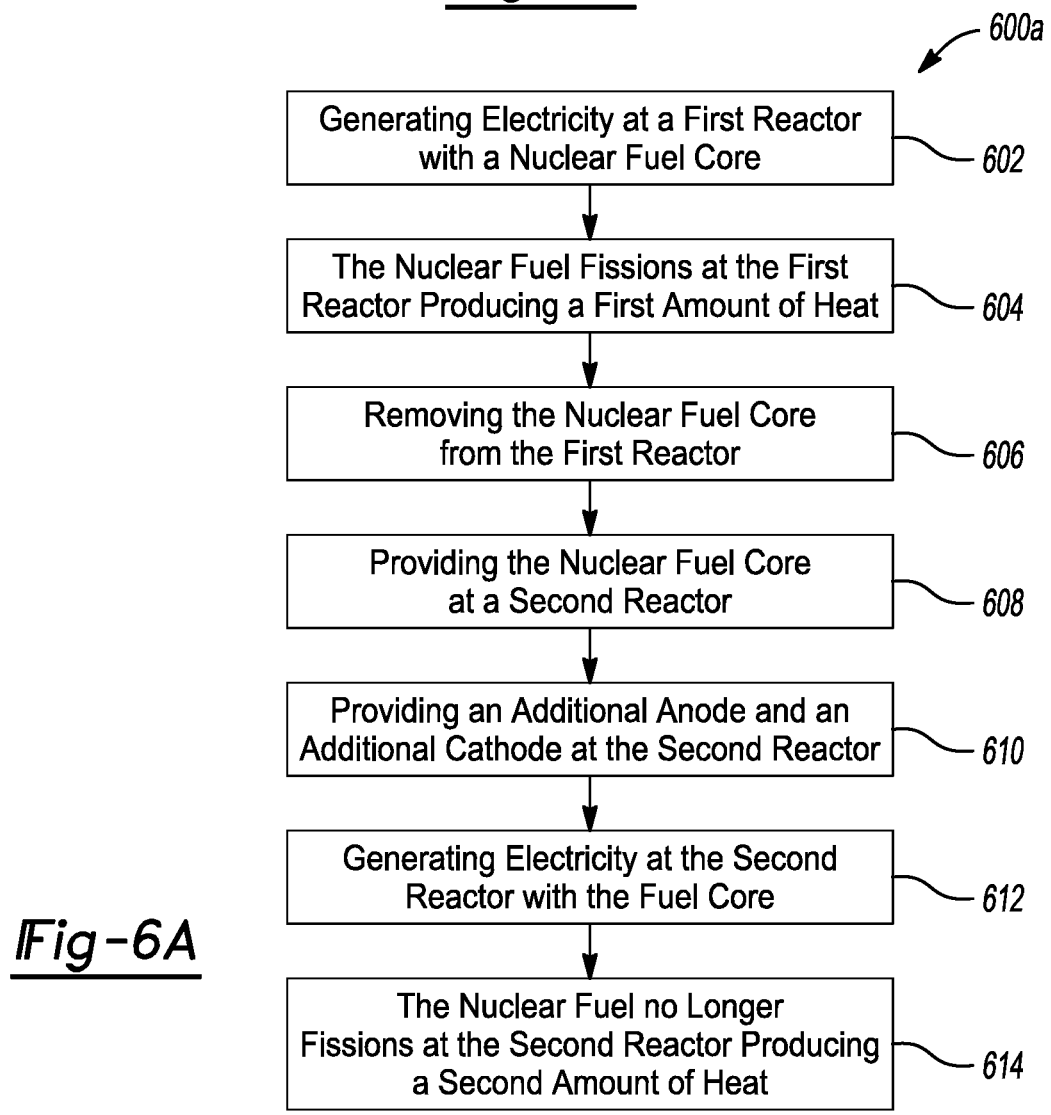
FIG. 6A is a flow diagram of a first method of generating electricity with the fuel element of FIG. 1 in accordance with the principles of the present disclosure.

With reference to FIG. 6A, a first method 600a of generating electricity with the fuel element 100 is illustrated. At step 602, the method 600a may include generating electricity at the first reactor 200 with the fuel element 100. The first reactor 200 may generate electricity with any TEC system (e.g., HITEC). At step 604, the fuel 110 of the fuel element 100 undergoes a fission reaction at the first reactor 200 producing the first amount of heat. The first amount of heat acts as the heat source 210 to boil off, or otherwise emit, electrons 202 from the cathode 104 to generate the first amount of electricity at the first reactor 200. At step 606, the method 600a may include, removing the fuel element 100 from the first reactor 200 after the fuel 110 of the fuel element 100 is depleted. At step 608, the method 600a may include, providing the fuel element 100 at the second reactor 300. The method 600a may also include, at step 610, providing an additional cathode 304 and an additional anode 308 at the second reactor 300. By providing additional cathodes 304 and anodes 308 at the second reactor 300, the overall surface area of the cathodes 304 and anodes 308 can be increased. At step 612, the second reactor 300 generates the second amount of electricity with the fuel element 100. The second amount of electricity may be less than the first amount of electricity. At step 614, the fuel 110 of the fuel element 100 produces a second amount of heat while no longer undergoing a fission reaction at the second reactor 300. The second amount of heat may be less than the first amount of heat.

Figure 6B:
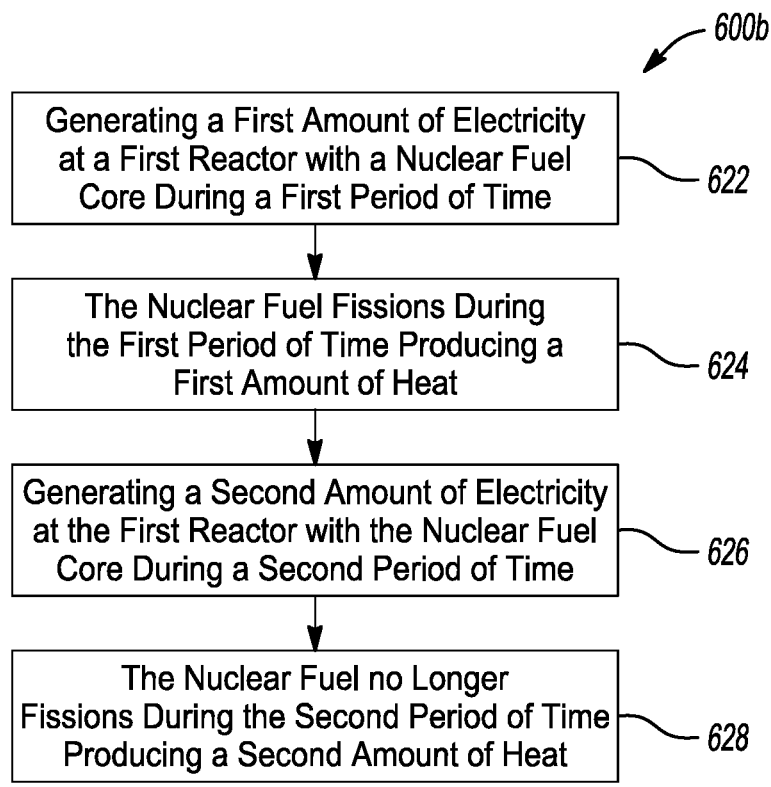
FIG. 6B is a flow diagram of a second method of generating electricity with the fuel element of FIG. 1 in accordance with the principles of the present disclosure.

With reference to FIG. 6B, a second method 600b of generating electricity with the fuel element 100 is illustrated. At step 622, the method 600b may include generating a first amount of electricity at the first reactor 200 with the fuel element 100 during a first period of time. The first reactor 200 may generate the first amount of electricity using any TEC system (e.g., HITEC) during the first period of time. At step 624, the fuel 110 undergoes a fission reaction during the first period of time producing a first amount of heat. At step 626, the method 600b may include generating a second amount of electricity at the first reactor 200 with the fuel element 100 during a second period of time. The first reactor 200 may generate the second amount of electricity with any plasma energy conversion system (e.g., HIPER). At step 628, the fuel 110 produces a second amount of heat while no longer undergoing a fission reaction during the second period of time. The second amount of heat may be less than the first amount of heat.

The following Clauses provide an exemplary configuration for a pusher assembly, as described above.

Clause 1: A method of generating electricity, the method comprising generating electricity at a first reactor with a nuclear fuel element; removing the nuclear fuel element from the first reactor; providing the nuclear fuel element at a second reactor; and generating electricity at the second reactor with the nuclear fuel element.

Clause 2: The method of clause 1, wherein the nuclear fuel element comprises: an anode; a cathode; a plasma having a first side facing the cathode and a second side facing the anode; and a nuclear fuel.

Clause 3: The method of clause 2, wherein the nuclear fuel comprises: a neutron-producing material; a neutron-moderating material; and a neutron-consuming material.

Clause 4: The method of clause 3, further comprising: producing a first amount of heat at the first reactor; and producing a second amount of heat at the second reactor.

Clause 5: The method of clause 4, wherein the first amount of heat is greater than the second amount of heat.

Clause 6: The method of any of clauses 3 to 5, further comprising fissioning the nuclear fuel at the first reactor, wherein generating electricity at the second reactor does not include fissioning the nuclear fuel.

Clause 7: The method of any of clauses 2 to 6, further comprising providing an additional anode and an additional cathode at the second reactor.

Clause 8: The method of any of clauses 2 to 7, further comprising providing an additional anode and an additional cathode at the second reactor, the anode having a first surface area, and the additional anode having a second surface area greater than the first surface area, the cathode having a third surface area, and the additional cathode having a fourth surface area greater than the third surface area.

Clause 9: The method of any of clauses 2 to 8, further comprising ionizing the plasma with a charged particle.

Clause 10: The method of any of clauses 2 to 9, further comprising creating a temperature gradient between the first side of the plasma and the second side of the plasma.

Clause 11: The method of clause 10, wherein a temperature at the first side is greater than a temperature at the second side.

Clause 12: A method of generating electricity, the method comprising: generating a first amount of electricity at a first reactor with a nuclear fuel element during a first period of time, wherein the nuclear fuel element produces a first amount of heat during the generation of the first amount of electricity; and generating a second amount of electricity at the first reactor with the nuclear fuel element during a second period of time, wherein the nuclear fuel element produces a second amount of heat during the generation of the second amount of electricity, wherein, the second amount of heat is less than the first amount of heat.

Clause 13: The method clause 12, wherein the first amount of electricity is greater than the second amount of electricity.

Clause 14: The method of clause 12 or clause 13, wherein the nuclear fuel element comprises: an anode; a cathode; a plasma having a first side facing the cathode and a second side facing the anode; and a nuclear fuel.

Clause 15: The method of clause 14, wherein the nuclear fuel comprises: a neutron-producing material; a neutron-moderating material; and a neutron-consuming material.

Clause 16: The method of clause 15, further comprising fissioning the nuclear fuel at the first reactor during the first period of time, wherein generating electricity at the second reactor does not include fissioning the nuclear fuel during the second period of time.

Clause 17: A system for generating electricity, the system comprising: a first reactor configured to generate electricity from a nuclear fuel element during a first period of time, the first reactor including a first anode and a first cathode, the first anode having a first surface area, and the first cathode having a second surface area; and a second reactor configured to generate electricity from the nuclear fuel element during a second period of time following the first period of time, the second reactor including a second anode and a second cathode, the second anode having a third surface area greater than the first surface area, and the second cathode having a fourth surface area greater than the second surface area.

Clause 18: The system of clause 17, wherein the nuclear fuel element comprises: an anode; a cathode; a plasma having a first side facing the cathode and a second side facing the anode; and a nuclear fuel.

Clause 19: The system of clause 18, wherein the nuclear fuel comprises: a neutron-producing material; a neutron-moderating material; and a neutron-consuming material.

Clause 20: The system of any of clauses 17 to 19, wherein: the nuclear fuel element produces a first amount of heat at the first reactor; and the nuclear fuel element produces a second amount of heat at the second reactor.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method of generating electricity, the method comprising:
   generating electricity, by thermionic emission, at a first reactor with a nuclear fuel element;
   fissioning the nuclear fuel element at the first reactor;
   removing the nuclear fuel element from the first reactor;
   providing the nuclear fuel element at a second reactor; and
   generating, by converting energy in a plasma disposed within the nuclear fuel element, electricity at the second reactor with the nuclear fuel element, wherein generating electricity at the second reactor does not include fissioning the nuclear fuel element,
   wherein, upon providing the nuclear fuel element at the second reactor, the nuclear fuel element comprises:
      an anode;
      a cathode;
      the plasma having a first side facing the cathode and a second side facing the anode; and
      a nuclear fuel, and
   wherein generating electricity at the second reactor does not include fissioning the nuclear fuel element.

2. The method of claim 1, wherein the nuclear fuel comprises:
   a neutron-producing material;
   a neutron-moderating material; and
   a neutron-consuming material.

3. The method of claim 2, further comprising:
   producing a first amount of heat at the first reactor; and
   producing a second amount of heat at the second reactor.

4. The method of claim 3, wherein the first amount of heat is greater than the second amount of heat.

5. The method of claim 1, further comprising providing an additional anode and an additional cathode at the second reactor.

6. The method of claim 1, further comprising providing an additional anode and an additional cathode at the second reactor, the anode having a first surface area, and the additional anode having a second surface area greater than the first surface area, the cathode having a third surface area, and the additional cathode having a fourth surface area greater than the third surface area.

7. The method of claim 1, further comprising ionizing the plasma with a charged particle.

8. The method of claim 1, further comprising creating a temperature gradient between the first side of the plasma and the second side of the plasma.

9. The method of claim 8, wherein a temperature at the first side is greater than a temperature at the second side.

10. The method of claim 1, the nuclear fuel element further comprising a sheath disposed about the plasma, the method further comprising:
    creating an electric field between the sheath and the cathode; and
    creating an electric field between the sheath and the anode.

11. The method of claim 1, wherein the method does not include generating electricity by thermionic emission at the second reactor with the nuclear fuel element.

* * * * *